United States Patent [19]

Chang

[11] Patent Number: 4,965,056
[45] Date of Patent: Oct. 23, 1990

[54] METHODS FOR PREPARING LEAD LANTHANUM ZIRCONATETITANATE POWDERS WITH CARBONATE PROCESSES

[75] Inventor: Yen-Hwei Chang, Tainan, Taiwan
[73] Assignee: Ming-Chin Wu, Kaohsiung, Taiwan
[21] Appl. No.: 507,474
[22] Filed: Apr. 11, 1990

Related U.S. Application Data

[63] Continuation-in-part of Ser. No. 184,597, Apr. 21, 1988, abandoned.
[51] Int. Cl.$^5$ ............................................. C01F 17/00
[52] U.S. Cl. .................... 423/263; 423/265; 423/598; 423/608; 252/62.9; 501/152; 501/134
[58] Field of Search ............... 423/263, 265, 598, 608, 423/419 P; 252/62.9; 501/152, 134

[56] References Cited

U.S. PATENT DOCUMENTS

| | | | |
|---|---|---|---|
| 3,510,254 | 5/1970 | Beii | 423/419 P |
| 3,917,780 | 11/1975 | Mazdiyasni et al. | 252/62.9 |
| 3,923,675 | 12/1975 | Mazdiyasni et al. | 423/598 |
| 4,061,583 | 12/1977 | Murata et al. | 423/598 |
| 4,696,810 | 9/1987 | Shirasaki et al. | 423/593 |

FOREIGN PATENT DOCUMENTS

| | | | |
|---|---|---|---|
| 0083275 | 6/1980 | Japan | 252/62.9 |
| 1215218 | 9/1986 | Japan | 423/598 |
| 2158117 | 7/1987 | Japan | 252/62.9 |

Primary Examiner—Theodore Morris
Assistant Examiner—Paige C. Harvey
Attorney, Agent, or Firm—Morton J. Rosenberg; David I. Klein

[57] ABSTRACT

A method of preparing PLZT powder with a carbonate process employing $Pb(NO_3)_2$, zirconium oxychloride and chlorides of La and Ti as starting materials. Solutions of each are blended together and added to a solution consisting of $NH_4OH$ and $(NH_4)_2CO_3$. The resulting solution undergoes refluxing at proper conditions for a period of time to coprecipitate a majority of particles which form nuclei covered by the carbonates of La, Ti and Pb, and a minority of particles which form nuclei which are covered by the hydroxides of La, Ti and Pb, which are calcined and ground to form PLZT powder.

2 Claims, 2 Drawing Sheets

METHODS FOR PREPARING LEAD LANTHANUM ZIRCONATETITANATE POWDERS WITH CARBONATE PROCESSES This Application is a continuation-in-part of U.S. Pat. Ser. No. 184,597, filed April 21, 1988, now abandoned.

FIELD OF THE INVENTION

This invention relates to methods for preparing ceramic compacts possessing electrical and electro-optical properties, especially to methods for preparing lead lanthanum zirconatetitanate (PLZT) powders with carbonate processes.

Conventionally, there are several methods for preparing lead lanthanum zirconate-titanate powders disclosed or reported. For example, U.S. Pat. No. 3,923,675 of Mazdiyasni and Brown discloses an improved method for preparing PLZT powder by hydrolytically decomposing a mixture of lead isoamyloxide, lanthanum isopropoxide, zirconium and titanium tertiary amyloxides in solution in isoamyl alcohol. After washing the hydroxides of Pb, La, Zr and Ti obtained subsequent to reflexing, the washed hydroxides are dried under vacuum at 60° C., to yield PLZT powders. The PLZT powders are calcined at 500° C. for fifteen minutes to one hour to convert the PLZT powders from an amorphous state to a crystalline state, the composition is then ground to effect comminution of the larger agglomerates.

The prior method of preparing PLZT powders, as described above, is found to have several disadvantages, as follows:

(a) The PLZT powders prepared by the prior art method are relatively expensive, owing to the use of organometallic compounds such as lead isoamyloxide, lanthanum ixopropoxide, and zirconium and titanium tertiary amyloxides as starting materials.

(b) Processes employing organometallic compounds as raw materials for preparing PLZT powders increases the risk of environmental pollution.

(c) It is well known by those skilled in the art that the specific weight of lead oxide is heavier than that of hydroxides of La, Zr, and Ti, and such causes their precipitates to segregate and results in inhomogeneity of the product.

In other prior art processes, such as that disclosed in U.S. Pat. No. 4,696,810, PLZT powders are produced with a coprecipitation process. However, the process is performed in a stepwise fashion, wherein one or more elements of a first component are precipitated or coprecipitated and thereafter in a succeeding step, one or more metal elements of a second component are precipitated or coprecipitated. Thus, by this method, elements such as lead and lanthanum are coprecipitated in a first step and subsequently titanium and zirconium are coprecipitated in a second step. The concept of precipitating the compounds consecutively is intended to provide means for controlling the powder characteristics by which of the elements is precipitated first.

However, such stepwise precipitation cannot produce the homogeneous and submicro-size PLZT powders produced by the adsorptive coprecipitation process of the instant invention.

In still other prior art processes, such as that disclosed in Japanese published patent application No. 62-158117, PLZT powders are produced utilizing a precipitating solution containing both $NH_4OH$ and $(NH_4)_2CO_3$, thereby producing both hydroxides and carbonates of lead, lanthanum, zirconium and titanium. However, the precipitation process is carried out in a successively stepwise manner and therefore cannot produce a PLZT product wherein the $(2ZRO_2).(CO_2)$ provides a nuclei for adsorbing the hydroxides and carbonates of lanthanum, titanium and lead.

Still other prior art methods are disclosed in U.S. Pat. No. 4,061,583; No. 3,917,780; and , No. 3,510,254, and Japanese published patent applications No. 61-215218 and No. 60-083275. None of these prior art methods disclose an adsorptive coprecipitation process wherein the $(2ZRO_2).(CO_2)$ forms a nuclei with a majority of the particles covered by carbonates of lanthanum, titanium and lead, and a minority of the particles are covered by hydroxides of lanthanum, titanium and lead, as provided in the instant invention.

It is an object of the present invention to provide improved methods using carbonate processes for preparing PLZT powders to overcome the disadvantages mentioned above.

It is another object of the present invention to provide methods using carbonate processes for preparing high purity, homogeneous and submicro-size PLZT powders.

It is yet another object of the present invention to provide methods using carbonate processes for cheaply preparing PLZT powders.

These and other objects and advantages of the present invention will be apparent to those skilled in the art upon consideration of the description in conjunction with the accompanying flow charts.

SUMMARY OF THE INVENTION

Figure 1:
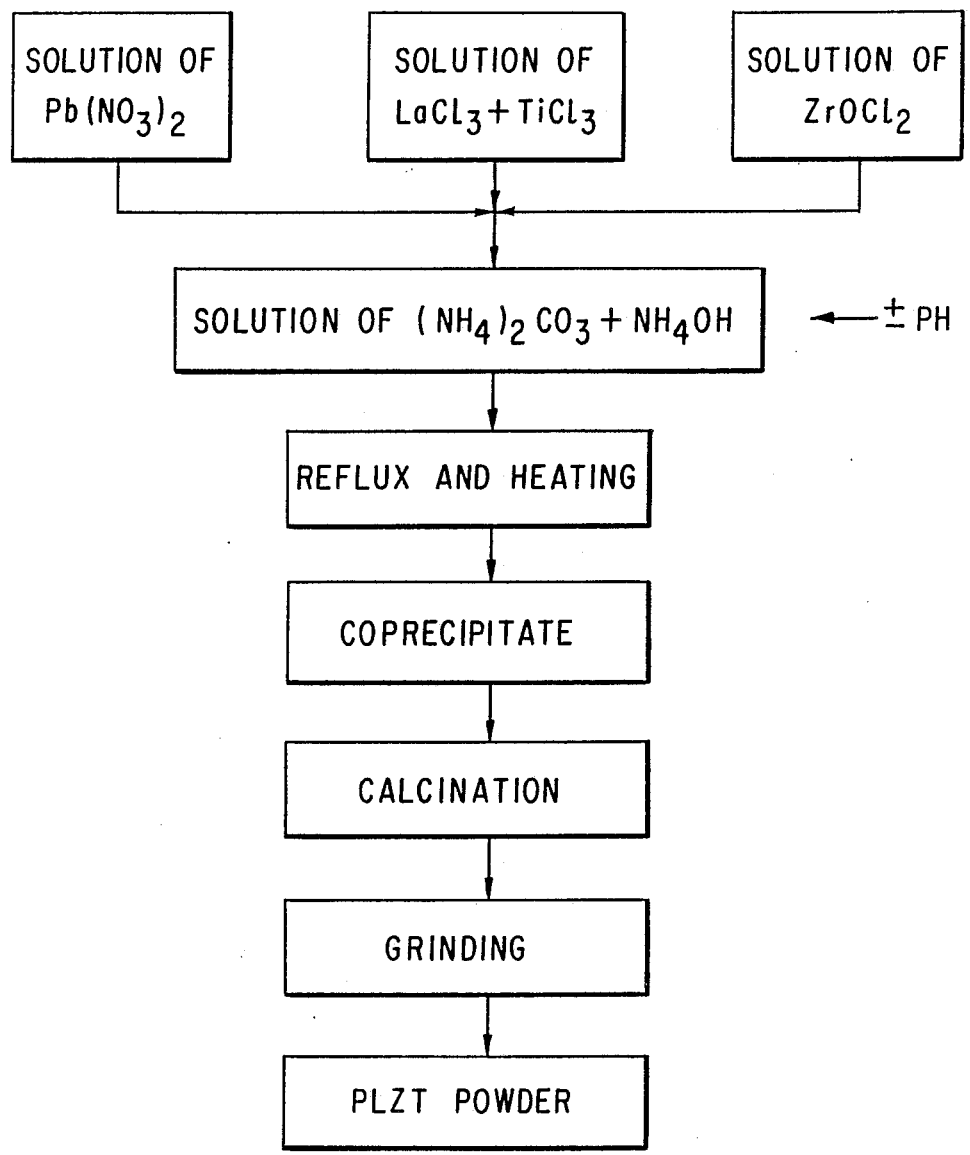
FIG. 1 shows a flow chart embodying a method using a carbonate process for preparing PLZT powders, and, FIG. 2 shows a flow chart embodying an alternate method using a carbonate process for preparing PLZT powder.

Referring to FIG. 1, there is shown a flow chart embodying the method for preparing PLZT powder using a carbonate process, according to the inventive concept. The process utilizes chlorides of lanthanum and titanium, such as $LaCl_3$, $TiCl_3$, and $ZrOCl_2$ (zirconium oxychloride), and $Pb(NO_3)2$ are employed as starting materials. Solutions of each of the starting materials are blended, forming a substantially homogeneous solution which is then slowly added to a solution of $NH_4OH$ and $(NH_4)_2CO_3$, wherein the ratio of $NH_4OH:(NH_4)_2CO_3$ is greater than one.

During the reaction, the now combined solutions are refluxed and maintained at a temperature ranging from 40° C. to 100° C., and maintained at a pH value ranging from 6 to 12, for a period of about one hour to six hours.

The product thus prepared is an amorphous coprecipitate containing a majority of particles of $Zr(OH)_2$ which form a nuclei about which the carbonates of La, Ti, and Pb, and a minority of particles of $Zr(OH)_2$ which form a nuclei covered with hydroxides of La, Ti, and Pb, thereby defining an adsorptive coprecipitation process.

The coprecipitates are then dried to form a powder and further calcined at a temperature higher than 600° C., for a period of about one hour to twenty hours to convert the powder to a crystalline form suitable for fabricating ceramic bodies. Thereafter, the calcined PLZT powder is ground to effect comminution of larger agglomerates.

The PLZT powder can be prepared by an alternative method for obtaining finer particles of carbonates of zirconium which form nuclei covered by carbonates of La, Ti and Pb.

Figure 2:
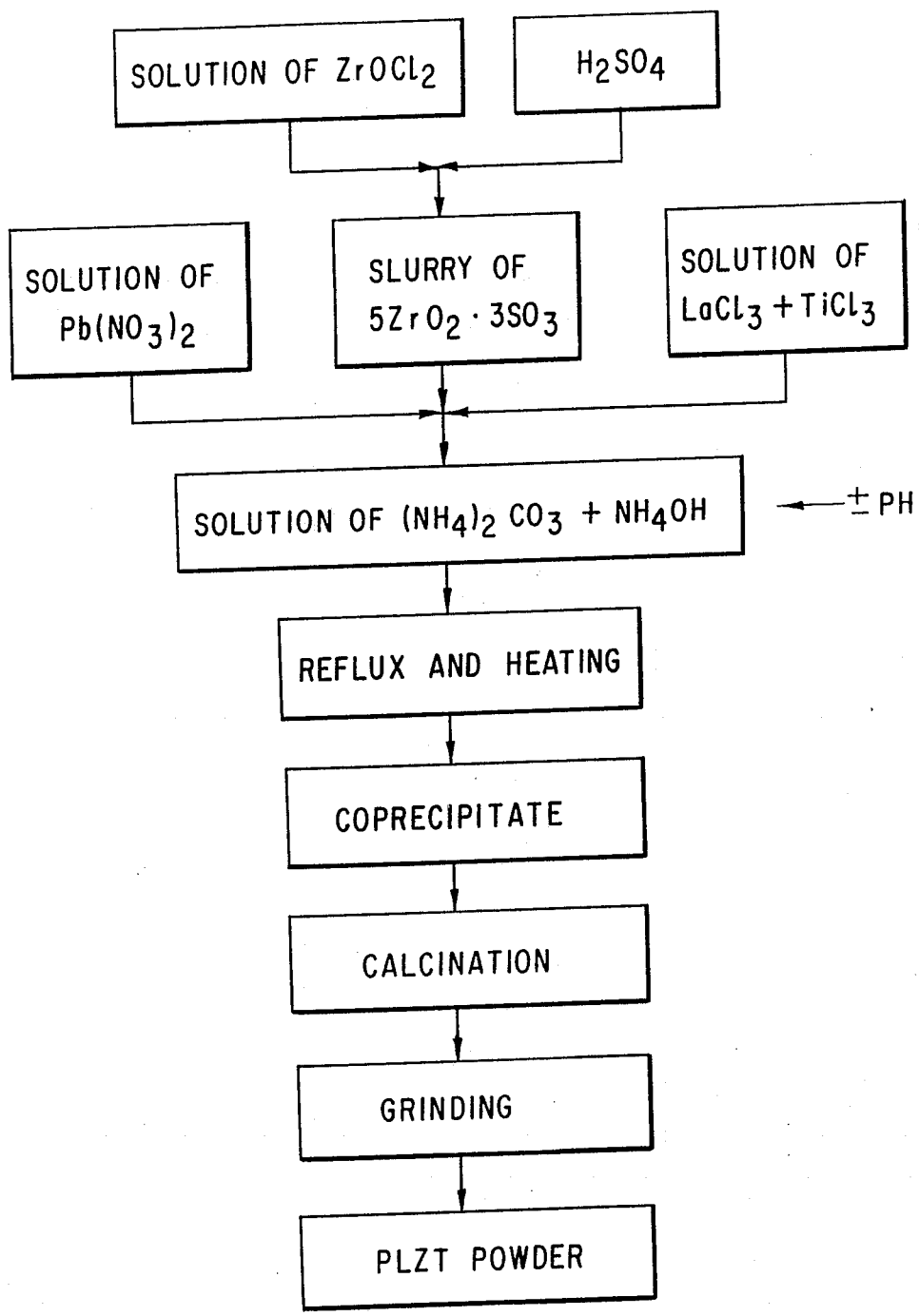

Referring to FIG. 2, there is shown another flow chart embodying the method using an adsorptive carbonate process for preparing PLZT powder according to an alternate embodiment of the present invention. The starting materials of $ZrOCl_2$, $LaCl_3$, $TiCl_3$, and $Pb(NO_3)_2$ are again employed. However, the $ZrOCl_2$ is first reacted with sulfuric acid to obtain a white precipitate of $(5ZrO_2).(3SO_3)$. The equation for this reaction is described as follows:

$$5ZrOCl_2 + 3H_2SO_4 + 2H_2O \rightarrow (5ZrO_2).(3SO_3) + 10HCl \quad (1)$$

It is to be noted that the concentration of zirconium ions should be less than 0.64 mol, and the atomic mass ratio of Zr: S should be less than 1.2, otherwise, the resultant of the reaction of the equation (1) is $\{ZrO(SO_4)_2\}^{-2}$, or complex ions of $\{ZrO(OH)SO_4\}^{-}\{ZrO(OH)SO_4\}^{-}$, instead of the required solid $(5ZrO_2).(3SO_3)$.

The solutions comprising the aforementioned starting materials of $LaCl_3$, $TiCl_3$, $Pb(NO_3)_2$, are blended together with the slurry of the $(5ZrO_2).(3SO_3)$ to form a substantially homogeneous mixture. This mixture is then slowly added to a solution of $NH_4OH$ and $(NH_4)_2CO_3$. Wherein, the ratio of $NH_4OH:(NH_4)_2CO_3$ is greater than one. The reacting conditions and the time period are to be maintained as previously described for the first embodiment shown in FIG. 1. The slurry of the $(5ZrO_2).(3SO_3)$ is further reacted within the blended solution into $(2ZrO_2).(CO_2)$ to stably reside in the solution. The equation for this reaction is described as follows:

$$2(5ZrO_2.3SO_3) + 5CO_3^{-2} + H_2O + 2e^{-} \rightarrow 5(2ZrO_2.CO_2) + 6SO_4^{-2} + H_2 \quad (2).$$

The reactions of $TiCl_3$, $LaCl_3$, and $Pb(NO_3)_2$, with the $NH_4OH$ and $(NH_4)_2CO_3$, respectively, are also as previously described in the first embodiment.

The product thus obtained is also an amorphous coprecipitate containing a majority of particles of $(2ZrO_2).(CO_2)$ forming a nuclei covered by carbonates of La, Ti, and Pb, and a minority of particles of the $(2ZrO_2).(CO_2)$ forming a nuclei covered by hydroxides of La, Ti and Pb. The process thereby providing the adsorptive coprecipitation wherein the $(2ZrO_2).(CO_2)$ provides the nucleus about which the carbonate and hydroxide compounds of Lanthanum, Titanium, and Lead form the La, Ti and Pb compounds be adsorbed over the nuclei of $(2ZrO_2).(CO_2)$. The coprecipitates are then dried and further calcined to convert the powder to a crystalline form.

It is apparent to those skilled in the art that carbonates can be effectively decomposed, by heating, into particles of high specific surface area. Such results in submicron-size lead lanthanum zirconate-titanate powders having particles finer and more homogeneous than the products prepared by prior art methods.

The purposes of $NH_4OH$ employed in the solution are mainly to precipitate the residual metallic ions of La, Ti and Pb which would reside in the solution after the reactions described in both the first and the second embodiments, shown in FIGS. 1 and 2, if only the $(NH_4)_2CO_3$ were used. The use of $NH_4OH$ also effectively reduces the loss of $(NH_4)_2CO_3$ and is utilized to neutralize the residual acid solution and further alkalize it into an alkaline solution. As previously stated, the $NH_4OH$ reacts with the residual metallic ions of La, Ti and Pb to form respective hydroxides and thereby improves the gain of the resulting PLZT powder product. It is also known by those skilled in the art that reacting temperatures higher than 80° C. facilitates the decomposition of $(NH_4)_2CO_3$ to release gaseous carbon dioxide. The $NH_4OH$ can offer an alkali environment to reduce these disadvantageous activities.

A more complete understanding of the invention can be obtained by referring to the following illustrative examples which are not intended, however, to be unduly limitive of the invention.

EXAMPLE I

A PLZT powder suitable for fabricating electrooptic ceramics with a formula of:

$$(Pb_{0.9} La_{0.1})(Zr_{0.65} Ti_{0.35})O_3$$

in which the ratio of La:Pb:Ti is 9:65:35 was selected to be prepared. Initially, a bowl containing a solution of equal volumes (0.5 liter) of $ZrOCl_2$ (0.65 mol), $TiCl_3$ (0.35 mol), and $LaCl_3$ (0.09 mol) and $Pb(NO_3)_2$ (0.91 mol) was prepared. Another bowl containing three liters of a solution of $NH_4OH$, and $(NH_4)_2CO_3$ with the ratio of $NH_4OH:(NH_4)_2CO_3$ being 9.1 was also prepared. Thereafter, the solution contained in the former bowl was solely added to the latter bowl and refluxed to react evenly.

The reacting temperature was maintained at 80° C. and the pH value was maintained at about 11 for a period of about two hours. The coprecipitating composition thus obtained was calcined at 850° C. for two hours after it was washed by clean water and dried at a temperature of 100° C. The calcined powder was ground by a proper grinder for twenty four hours and dried to obtain the selected PLZT powder.

EXAMPLE II

The same composition of PLZT powder was selected to be prepared in this example as was selected in Example I. Initially, sulfuric acid having a normality of 32 N was added to a solution of $ZrOCl_2$ (0.35 mol), wherein, the atomic ratio of S:Zr is 3:5. The solution was maintained at a temperature of 80° C. for a period of four hours to obtain a white precipitate of $(5ZrO_2).(3SO_3)$. Another two solutions, one of which comprising equal volumes (0.5 liter) of $TiCl_3$ (0.188 mol), $LaCl_3$ (0.096 mol) and $Pb(NO_3)_2$ (0.49 mol), and the other one comprising three liters of $NH_4OH$ and $(NH_4)_2CO_3$ with the ratio of $NH_4OH:(NH_4)_2CO_3$ being 4.3, were also respectively prepared. A 0.5 liter amount of the slurry of the $(5ZrO_2).(3SO_3)$ is blended with the solution containing the $TiCl_3$, $LaCl_3$, $Pb(NO_3)_2$ and then slowly added to the solution of $NH_4OH$ and $(NH_4)2CO_3$ within a time period of one hour. The solutions thus mixed were refluxed and maintained at a temperature of 80° C. for a period of two hours. The coprecipitating composition thus obtained was also calcined at 850° C. for two hours after it was washed by clean water and dried at a temperature of 100° C. The calcined powder was ground for twenty four hours and dried to obtain the selected PLZT powder.

In the table below, there is shown the results of the composition analysis for the samples of the PLZT powders prepared in the examples, together with the standard composition of the PLZT powder, whose ratio of La:Zr:Ti is 9:65:35, for comparison.

| COMPOSITION (Weight %) | PbO | La$_2$O$_3$ | ZrO$_2$ | TiO$_2$ |
|---|---|---|---|---|
| STANDARD COMPOSITION OF PLZT POWDER (La:Pb:Ti - 9:65:35) | 62.82 | 4.54 | 24.19 | 8.44 |
| SAMPLE OF EXAMPLE I (NH$_4$OH/(NH$_4$)$_2$CO$_3$ = 9.1) | 62.80 | 4.48 | 25.34 | 7.38 |
| SAMPLE OF EXAMPLE II NH$_4$OH/(NH$_4$)$_2$CO$_3$ = 4.3 | 61.86 | 4.81 | 25.08 | 8.25 |

The starting materials such as the chlorides of lanthanum, titanium, and zirconium oxychloride employed in preparing the PLZT powders according to the present invention are relatively cheap compounds. For example, the chloride of titanium is available from FeTiO$_3$ by adding the ground powder to a solution of HCl. The equation of such a reaction is described as follows:

$$TiO_2 + 4CHl \rightarrow TiCl_4 + 2H_2O.$$

The remaining chlorides of lanthanum and zirconium can be obtained in similar ways, and the equations are described as follows:

$$La_2O_3 + 6HCl \rightarrow 2LaCl_3 + 3H_2O$$

$$ZrO_2 + 2HCl \rightarrow ZrOCl_2 + H_2O.$$

In comparison with the prior art methods, such as the method provided by U.S. Pat. No. 3,923,675, which employs the starting materials organometallic compounds (e.g., lead, isoamyloxide, lanthanum isopropoxide, zirconium tertiary amyloxide, and titanium tertiary amyloxides), the methods of the present invention do not present a risk of pollution by the residual metallic compounds. The common and inexpensive materials of the chlorides of Ti, La and Zr renders the products thus produced at low cost. The coprecipitating powders of this invention are homogeneous owing to the closely specific weights among the carbonates of La, Zr, Ti, and Pb, and the fact that the high surface activities of the carbonates result in the micro-size PLZT powder.

As will be evident to those skilled in the art, modifications of the present invention can be made in view of the foregoing disclosure without departing from the spirit and scope of the invention.

I claim:

1. A method of preparing PLZT powder using an adsorptive carbonate process, consisting essentially of the steps of:
    (a) adding a solution of zirconium oxychloride to sulfuric acid to obtain a precipitate of (5ZrO$_2$).(3SO$_3$);
    (b) blending together respective solutions of Pb(NO$_3$)$_2$, chlorides of La and Ti, and a slurry of said (5ZrO$_2$).(3SO$_3$) precipitate to form a blended mixture;
    (c) combining said blended mixture with a solution consisting of NH$_4$OH and (NH$_4$)$_2$CO$_3$;
    (d) refluxing the combination of step (c) at a temperature in the range of 40° C. to 100° C. and a pH value in the range of 6 to 12 for a period of about 1 to 6 hours to coprecipitate a majority of particles of (2ZrO$_2$).(CO$_2$) forming nuclei covered by the carbonates of La, Ti and Pb, and a minority of particles of (2ZrO$_2$).(CO$_2$) forming nuclei covered by the hydroxides of La, Ti and Pb, and;
    (e) drying the coprecipitates by heating to obtain amorphous PLZT powder.

2. The method for preparing PLZT powder as recited in claim 1 wherein the concentration of zirconium ions are less than 0.64 mol and an atomic mass ratio of ZR:S is less than 1.2.

* * * * *